United States Patent
Kouchmeshky et al.

(10) Patent No.: US 9,556,726 B2
(45) Date of Patent: Jan. 31, 2017

(54) USE OF A FRACTAL ANTENNA IN ARRAY DIELECTRIC LOGGING

(71) Applicants: Babak Kouchmeshky, Kingwood, TX (US); Stanislav W. Forgang, Houston, TX (US); Rashid W. Khokhar, Sugar Land, TX (US)

(72) Inventors: Babak Kouchmeshky, Kingwood, TX (US); Stanislav W. Forgang, Houston, TX (US); Rashid W. Khokhar, Sugar Land, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 238 days.

(21) Appl. No.: 14/280,037

(22) Filed: May 16, 2014

(65) Prior Publication Data

US 2015/0330216 A1 Nov. 19, 2015

(51) Int. Cl.
*G01V 3/00* (2006.01)
*E21B 47/12* (2012.01)
*G01V 3/12* (2006.01)
*E21B 49/00* (2006.01)
*G01V 3/26* (2006.01)
*G01V 3/30* (2006.01)
(Continued)

(52) U.S. Cl.
CPC ........... *E21B 47/122* (2013.01); *E21B 47/011* (2013.01); *E21B 49/00* (2013.01); *G01V 3/12* (2013.01); *G01V 3/26* (2013.01); *G01V 3/30* (2013.01); *G01V 3/28* (2013.01)

(58) Field of Classification Search
CPC .............. G01V 3/28; G01V 3/30; E21B 47/00
USPC .......................................................... 324/338
See application file for complete search history.

(56) References Cited

U.S. PATENT DOCUMENTS

| 6,525,691 B2 | 2/2003 | Varadan et al. |
| 7,248,223 B2 * | 7/2007 | Habib ............ H01Q 1/36 343/700 MS |
| 2004/0012392 A1 | 1/2004 | McCormick |

(Continued)

FOREIGN PATENT DOCUMENTS

EP 0186570 B1 8/1991

OTHER PUBLICATIONS

Chang, et al., "Novel Reconfigurable Loop Antenna for Compact Mobile Phone", 3B2-3, Proceedings of ISAP2012, Nagoya, Japan, pp. 818-821.

(Continued)

*Primary Examiner* — Reena Aurora
(74) *Attorney, Agent, or Firm* — Cantor Colburn LLP

(57) ABSTRACT

An apparatus for estimating a property of an earth formation includes: a carrier configured to be conveyed through a borehole penetrating an earth formation; a first fractal-shaped antenna element disposed on the carrier and configured to at least one of transmit electromagnetic energy into the formation and receive electromagnetic energy from the formation; and a second fractal-shaped antenna element electrically connected to the first fractal-shaped antenna element at a connection and configured to at least one of transmit electromagnetic energy into the formation and receive electromagnetic energy from the formation; wherein the second fractal-shaped antenna element is substantially a mirror image of the first fractal antenna element with respect to a reflection about the connection.

20 Claims, 12 Drawing Sheets

(51) Int. Cl.
   *E21B 47/01*   (2012.01)
   *G01V 3/28*   (2006.01)

(56) References Cited

U.S. PATENT DOCUMENTS

| | | |
|---|---|---|
| 2006/0170604 A1 | 8/2006 | Almog et al. |
| 2010/0176813 A1 | 7/2010 | Simon |
| 2011/0095955 A1 | 4/2011 | Cohen |
| 2011/0221443 A1 | 9/2011 | Bittar et al. |
| 2011/0251794 A1 | 10/2011 | Bittar et al. |
| 2014/0049430 A1 | 2/2014 | Koski, II |
| 2014/0312906 A1* | 10/2014 | Gold .................. G01V 3/20 324/334 |

OTHER PUBLICATIONS

Piazza, et al., "Design and Evaluation of a Reconfigurable Antenna Array for MIMO Systems", IEEE Transactions on Antennas and Propagation, vol. 56, No. 3, Mar. 2008, pp. 869-881.
International Search Report and the Written Opinion of the International Searching Authority; PCT/US2015/028691; Mailed Jul. 22, 2015; International Search report, 4 pages; Written Opinion of the International Searching Authority, 10 pages.

\* cited by examiner

USE OF A FRACTAL ANTENNA IN ARRAY DIELECTRIC LOGGING

BACKGROUND

Earth formations may be used for various purposes such as hydrocarbon production, geothermal production, and carbon dioxide sequestration. In order to efficiently use an earth formation, the formation is characterized by performing measurements of many different properties using one or more tools conveyed through a borehole penetrating the formation. One category of tools includes tools that measure electrical characteristics of the earth formation such as resistivity or dielectric constant. Conventional resistivity and dielectric tools typically use a coil as an antenna to transmit electromagnetic signals into or receive electromagnetic signals from the formation in order to measure the resistivity or dielectric constant. Due to the physical size constraints, the desired transmitting efficiency for probing deep into the formation may be compromised. Hence, it would be well received in the drilling and geophysical exploration industries if designs of resistivity and dielectric tools could be improved to probe deeper into earth formations.

BRIEF SUMMARY

Disclosed is an apparatus for estimating a property of an earth formation includes: a carrier configured to be conveyed through a borehole penetrating an earth formation; a first fractal-shaped antenna element disposed on the carrier and configured to at least one of transmit electromagnetic energy into the formation and receive electromagnetic energy from the formation; and a second fractal-shaped antenna element electrically connected to the first fractal-shaped antenna element at a connection and configured to at least one of transmit electromagnetic energy into the formation and receive electromagnetic energy from the formation; wherein the second fractal-shaped antenna element is substantially a mirror image of the first fractal antenna element with respect to a reflection about the connection.

Also disclosed is a method for estimating a property of an earth formation. The method includes: conveying a carrier through a borehole penetrating the earth formation; transmitting electromagnetic energy into the formation using a transmitter antenna disposed on the carrier; receiving return electromagnetic energy from the formation due to the transmitted electromagnetic energy interacting with the formation using a receiver antenna disposed on the carrier; and estimating the property using a processor coupled to the receiver and configured estimate the property using the return electromagnetic energy; wherein at least one of the transmitter antenna and the receiver antenna comprise a first fractal-shaped antenna element and a second fractal-shaped antenna element electrically connected to the first fractal-shaped antenna element at a connection, the second fractal-shaped antenna element being substantially a mirror image of the first fractal-shaped antenna element with respect to a reflection about the connection.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the figures.

Disclosed are apparatus and method for estimating an electrical property of an earth formation from a borehole penetrating the formation. The apparatus and method involve transmitting and/or receiving electromagnetic energy into the formation using one or more unique fractal-shaped antennas. The one or more fractal-shaped antennas result in having a wide useful frequency bandwidth for which, in one or more embodiments, an impedance matching network is not needed, or if needed, a simplified impedance matching network having reduced size may be used freeing up space constrained by the size of the instrument to fit into the investigated borehole.

Figure 1:
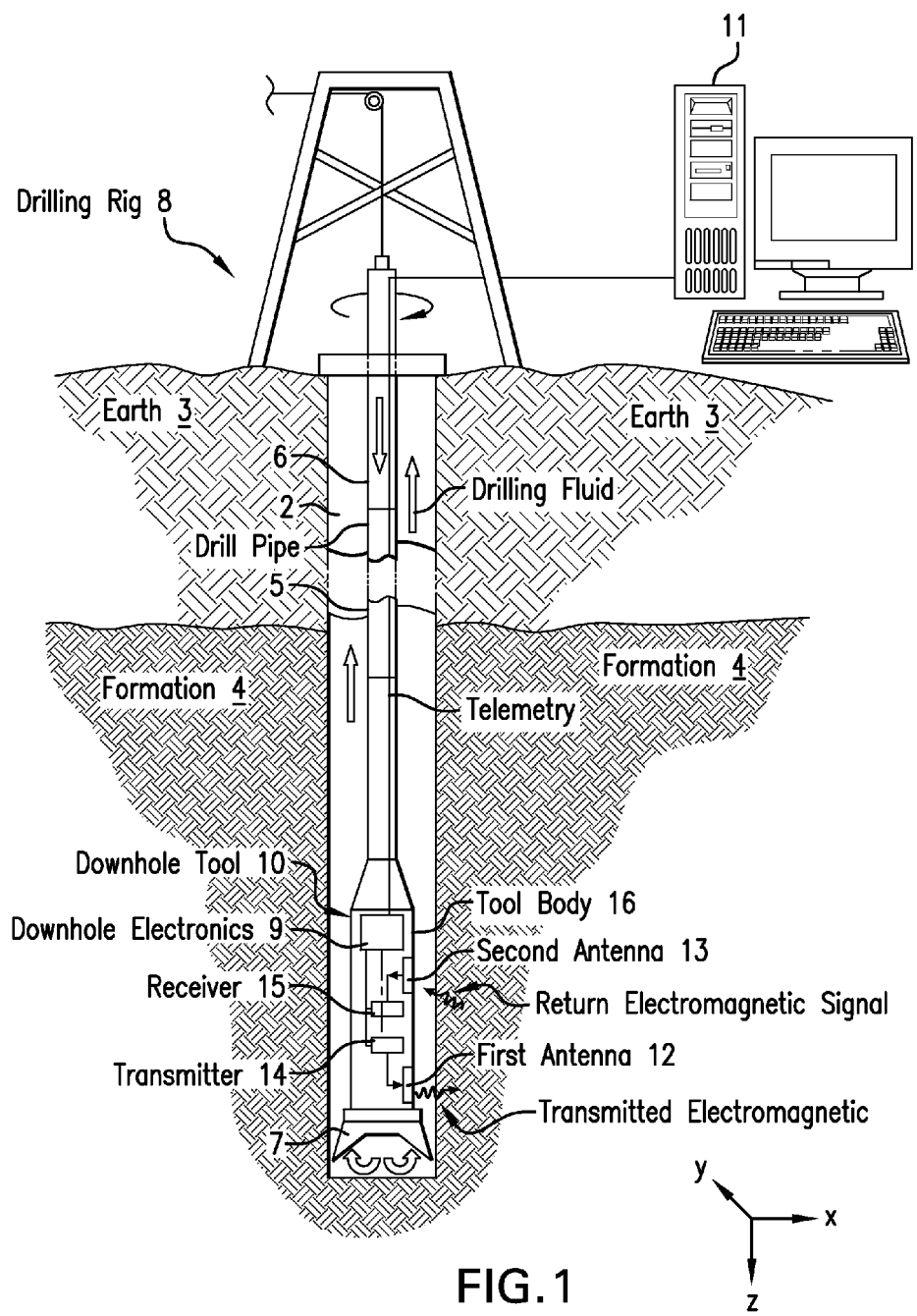
FIG. 1 illustrates a cross-sectional view of an exemplary embodiment of a downhole tool disposed in a borehole penetrating the earth.

FIG. 1 illustrates a cross-sectional view of an exemplary embodiment of a downhole tool 10 disposed in a borehole 2 penetrating the earth 3, which includes an earth formation 4. The downhole tool 10 in FIG. 1 includes a tool body 16 that provides a support structure or protection for components of the tool 10. The formation 4 represents any subsurface material of interest that may be sensed by the tool 10. The subsurface material can include an earth formation material and/or a material disposed in the borehole 2, any of which may be in the form of a solid, liquid and/or gas. The downhole tool 10 is conveyed through the borehole 2 by a carrier 5, which can be a drill tubular such as a drill string 6. A drill bit 7 is disposed at the distal end of the drill string 6. A drill rig 8 is configured to conduct drilling operations such as rotating the drill string 6 and thus the drill bit 7 in order to drill the borehole 2. In addition, the drill rig 8 is configured to pump drilling fluid through the drill string 6 in order to lubricate the drill bit 7 and flush cuttings from the borehole 2. Downhole electronics 9 are configured to operate the downhole tool 10, process measurement data obtained downhole, and/or act as an interface with telemetry to communicate data or commands between downhole components and a computer processing system 11 disposed at the surface of the earth 3. Non-limiting embodiments of the telemetry include pulsed-mud and wired drill pipe. System operation and data processing operations may be performed by the downhole electronics 9, the computer processing system 11, or a combination thereof. The downhole tool 10 may be operated continuously or at discrete selected depths in the borehole 2 or may be placed in a stationary in situ embodiment. In an alternative embodiment, the carrier 5 may be an armored wireline, which can also provide communications between the downhole electronics 9 and the processing system 11.

The downhole tool 10 may be configured to measure responses related to the resistivity, or its inverse conductivity, or a dielectric permittivity of the formation 4. The measurable physical values are magnetic and electric fields together with electric voltages and currents produced by these fields. The properties of matter such as resistivity, conductivity, and permittivity are calculated using the above noted measurable physical values. Resistivity measurements involve a first antenna 12 transmitting electromagnetic energy such as electromagnetic signals of a certain frequency (generally from about 100 kHz to about 10 MHz) into the formation 4 where the transmitted electromagnetic energy induces circulating electric currents. The circulating currents in turn emit return electromagnetic energy producing signals in a second antenna 13. In one or more embodiments, one antenna is used for transmitting and receiving electromagnetic signals (i.e., the first antenna 12 and the second antenna 13 are the same antenna). It can be appreciated that currents circulating in the formation 4 are increasing with respective increase in formation conductivity. Hence, the magnitude of the return electromagnetic signals is related to the magnitude of the resistivity or conductivity of the formation 4. In one or more embodiments, changes in the measured resistivity or conductivity with depth are displayed or plotted as an image. The image may be in a radial direction from the borehole, or along the borehole axis or it may be azimuthal with up to 360 degree circumferential coverage around the borehole.

As illustrated in FIG. 1, the first antenna 12 is coupled to a transmitter 14 and the second antenna 13 is coupled to a receiver 15. The transmitter 14 is an electronic module in one or more embodiments and is configured to transmit (or send) electric current (i.e., electric current signals) at the frequency desired for the electromagnetic energy (i.e., electromagnetic energy signals) to be transmitted by the first antenna 12. The transmitter 14 may also be coupled to the downhole electronics 9 or the computer processing system 11 for receiving commands related to the operation of the downhole tool 10. The receiver 15 is an electronic module in one or more embodiments and is configured to receive electric signals from the second antenna 13 for processing, which may include amplification, conditioning, filtering, and/or conversion to a format for transmitting received information to the downhole electronics 9 or the computer processing system 11. It can be appreciated that in one or more embodiments the functions of the transmitter 14 and the receiver 15 can be combined into one unit referred to as a "transceiver."

The downhole tool 10 may be configured to measure a response related to the dielectric constant (also referred to as dielectric permittivity) of the formation 4. These types of measurements involve transmitting electromagnetic energy that propagates through the formation 4 using the first antenna 12 and is received using the second antenna 13. In these embodiments, the received electromagnetic energy may also be referred to as return electromagnetic energy. The frequency of the transmitted electromagnetic energy is generally higher than the frequency used for resistivity logging and is generally from about a few MHz and into the GHz range. Measurements of the propagation electromagnetic signals in order to determine the dielectric permittivity include signal attenuation and signal phase-shift that occurred along a certain propagation distance, generally along the spacing between the first antenna 12 and the second antenna 13. Using these measurements in addition to the electrical conductivity, the dielectric constant may be determined using Maxwell's equations as known in the art. In addition, porosity of the formation may be determined using measurements of the signal propagation time using equations known in the art knowing that the propagation time in a formation that is a water filled matrix is substantially higher than that in a hydrocarbon filled matrix.

It can be appreciated that signal attenuation and phase-shift measurements may be performed by comparing the received electromagnetic signals to a reference signal, which may be generated by a processor. In one or more embodiments, the reference signal may be the transmitted electromagnetic energy or signal transmitted by the first antenna 12.

Figure 2:
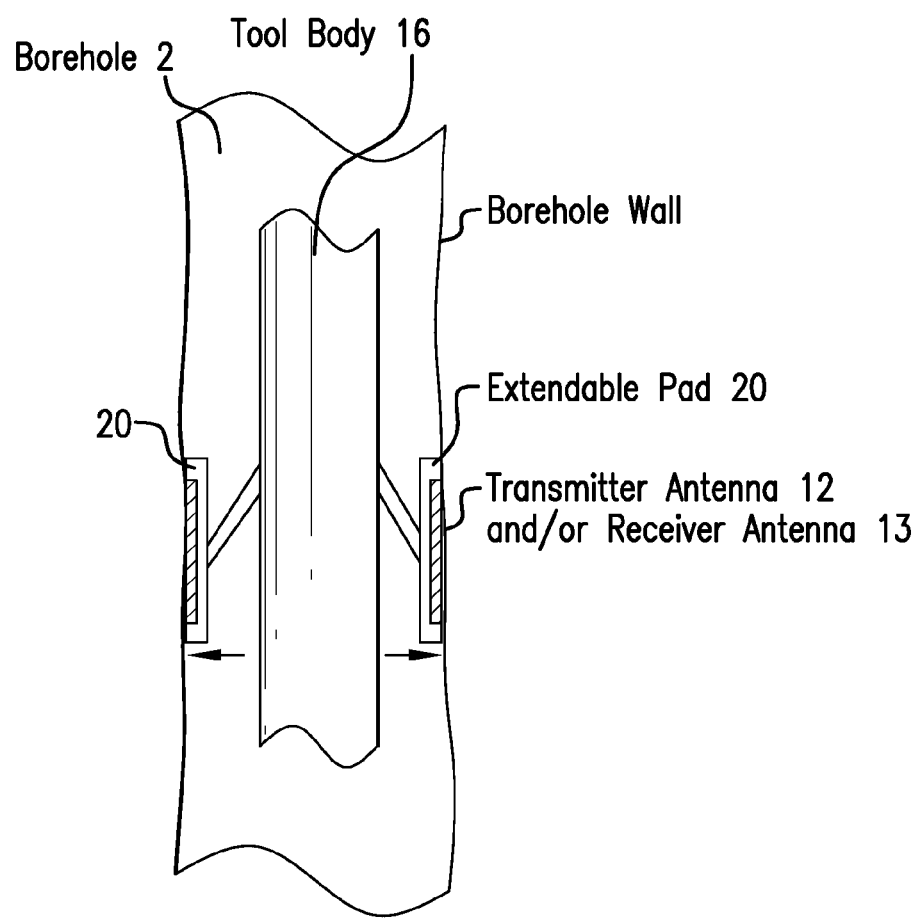
FIG. 2 depicts aspects of an extendable pad having transmitting and receiving antennas.

In one or more embodiments for resistivity or dielectric logging, the first antenna 12 and/or the second antenna 13 may be disposed on one or more pads 20 as illustrated in FIG. 2. The pads 20 are configured to extend from the downhole tool 10 and make contact with the borehole wall.

Figure 3:
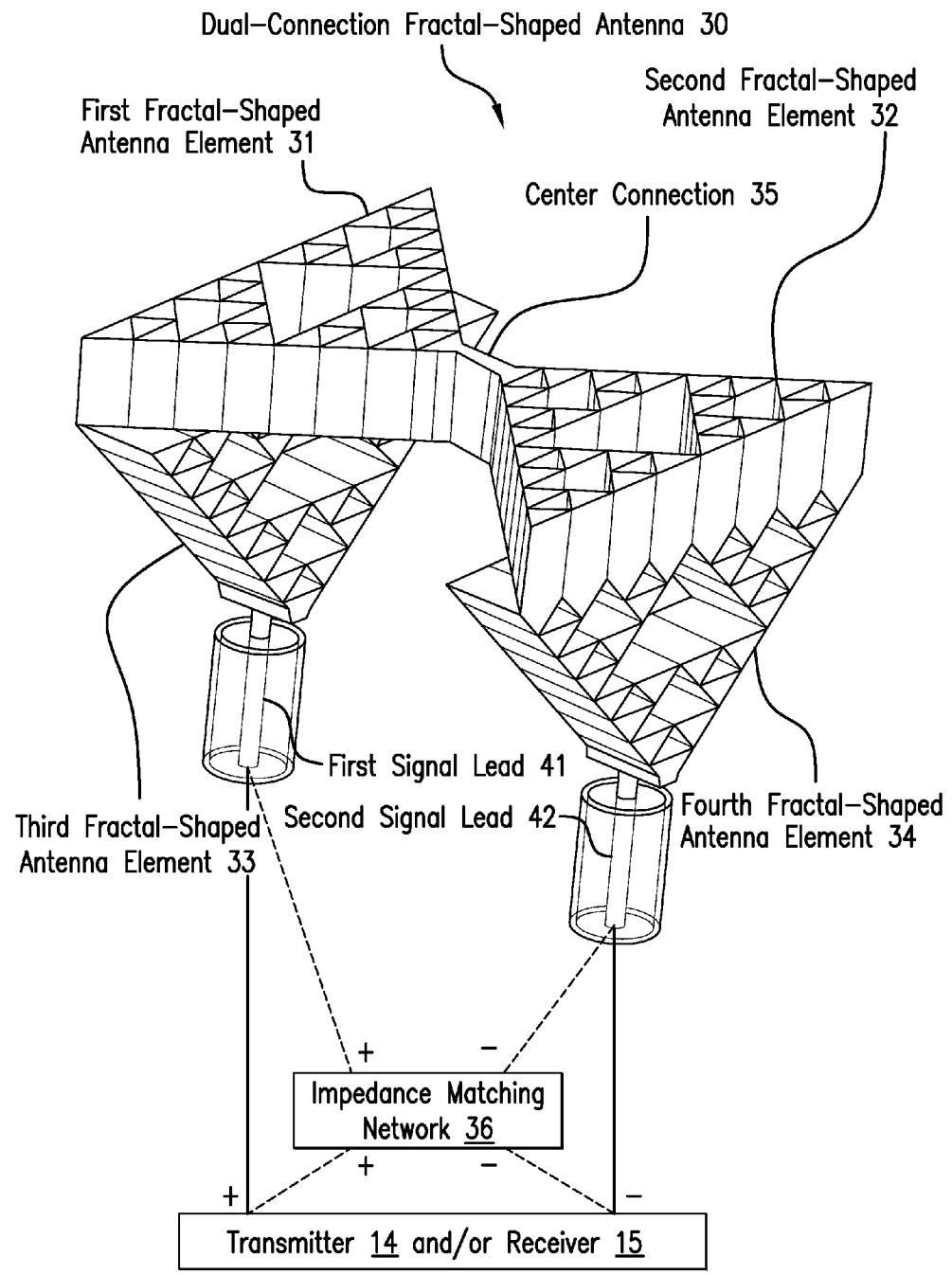
FIG. 3 depicts aspects of a dual-feed fractal antenna in a three-dimensional view.

Refer now to FIG. 3, which depicts aspects of a dual-connection fractal-shaped antenna 30 that may be used as the transmitter antenna 12 and/or the receiver antenna 13, in a three-dimensional view. The antenna 30 includes a first fractal-shaped antenna element 31 and a second fractal-shaped antenna element 32. The first fractal-shaped antenna element 31 is connected to the second fractal-shaped antenna element 32 by a center connection 35. The second fractal-shaped antenna element 32 is a mirror image of the first fractal-shaped antenna element 31 about or with respect to the center connection 33. In other words, rotating the first antenna element 31 180° about an axis (a vertical axis in FIG. 3) traversing the center connection 35 will produce the second antenna element 32. The center connection 35 itself is part of the antenna assembly. A third fractal-shaped antenna element 33 is connected to the first fractal-shaped antenna element 31 at an end of the element 31. A fourth fractal-shaped antenna element 34 is connected to the second fractal-shaped antenna element 32 at an end of the element 32 that is opposite of the end of the center connection 35. The fractal-shaped antenna elements are generally fabricated from an electrically conductive material such as a metal for example. A first signal lead 41 is connected to the bottom end of the third fractal-shaped antenna element 33 while a second signal lead 42 is connected to the bottom end of the fourth fractal-shaped antenna element 34. The signal leads 41 and 42 are connected to the transmitter 14 and/or receiver 15 either directly (shown connected using solid lines) to conserve space or optionally through an impedance matching network 36 (shown connected using dashed lines) to further improve signal transmission and/or reception. In one or more embodiments, the matching network 36 (+ and − used to differentiate terminals) is configured to provide an input impedance into the dual-connection fractal-shaped antenna 30 of 50 ohms in order to match the impedance of a coaxial cable connecting the transmitter and/or receiver to the antenna 30. It can be appreciated that in one or more embodiments, the matching network 36 is a π-network having resistors, capacitors, and/or inductors as known in the art. In the embodiment of FIG. 3, each of the fractal-shaped antenna elements 31-34 are identical, but have different orientations (e.g., antenna elements 31 and 32 are horizontal while antenna elements 33 and 34 are vertical). In the embodiment of FIG. 3, the antenna element 33 defines a plane that is orthogonal to a plane defined by the antenna element 31 and the antenna element 34 defines a plane that is orthogonal to a plane defined by the antenna element 32. In other embodiments, the antenna elements 33 and 34 may be at other non-zero angles with respect to the antenna elements 31 and 32, respectively. It can be appreciated that the dual-connection fractal-shaped antenna 30 may include more than two connections and signal leads as more than two of the connections can be used at different positions on the antenna to alter the equivalent electrical length of the antenna and hence change the operating frequency of the antenna.

As used herein, the term "fractal-shaped" relates to any shape having a base pattern or motif and a self-similar design. The fractal shape includes a scaled down replication of the base motif. The first scaled-down replication superimposed over a base motif figure may be referred to as a first iteration (i.e., N=1). The additional superposition of another replication to yet a smaller scale would be the second iteration (i.e., N=2). Each replication may be changed from the base motif by linear displacement and/or rotation. The fractal may be defined as a superposition of one or more scaled-down replications (i.e., one or more iterations) superimposed over the base motif figure. The positioning of each replication may be performed by rotation, stretching, and translation. It can be appreciated that different fractal shapes may include straight and/or non-straight lines. Examples of motifs known in the art include Koch, Minkowski, Cantor, torn square, Mandelbrot, Caley tree, monkey's swing, Sierpinski gasket, and Julia. In that terms for describing fractal antennas or fractal-shaped antennas are known in the art, these terms are no longer discussed in detail herein. It can be appreciated that while the base motif used for illustration purposes herein is based on a triangle, other geometric shapes and/or features may also be used.

Figure 4:
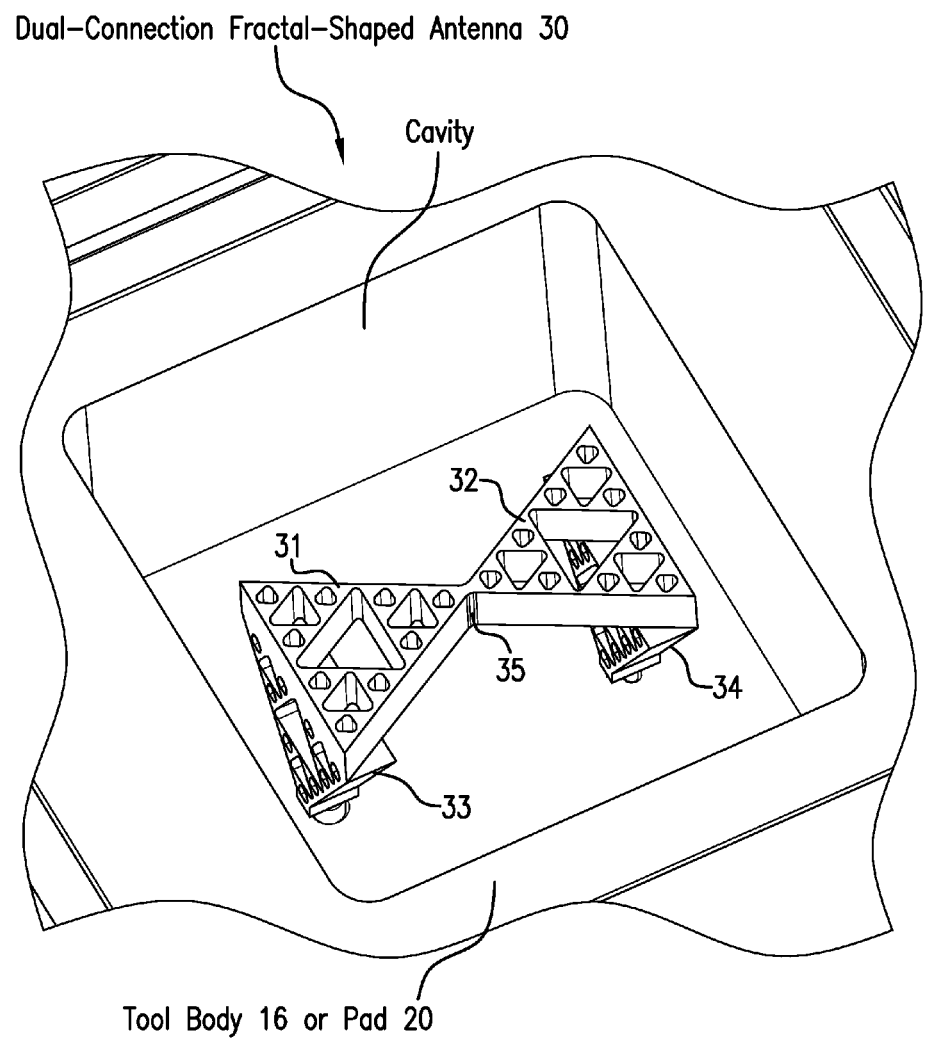
FIG. 4 depicts aspects of the dual-feed fractal antenna in another three-dimensional view.
Figure 5:
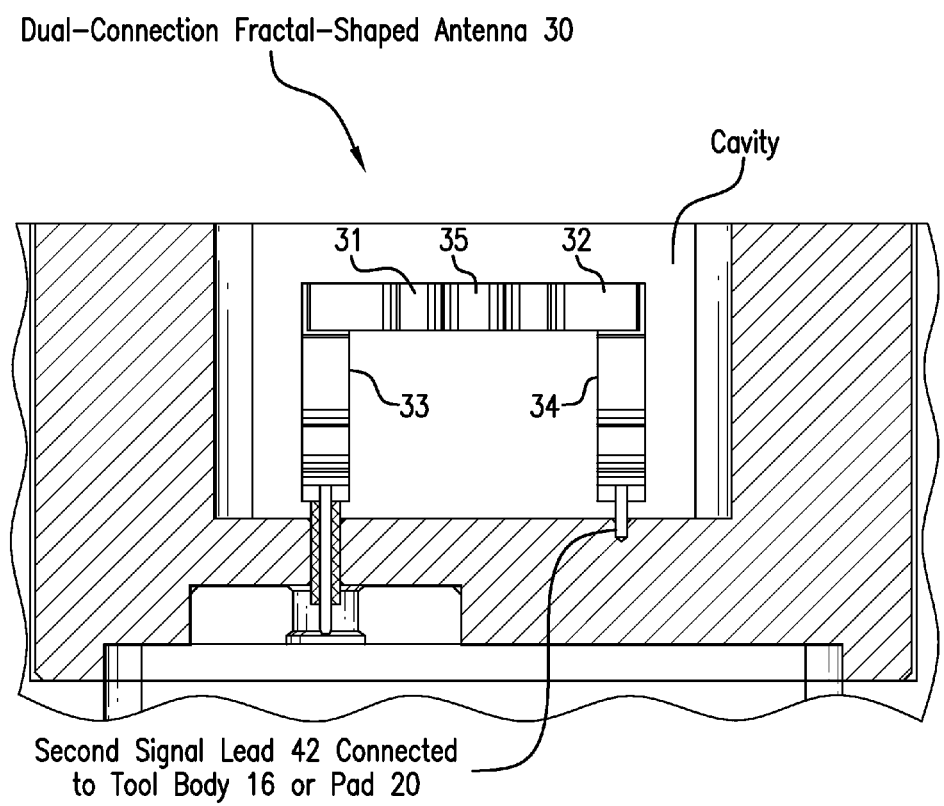
FIG. 5 depicts aspects of the dual-feed fractal antenna in a side view.
Figure 6:
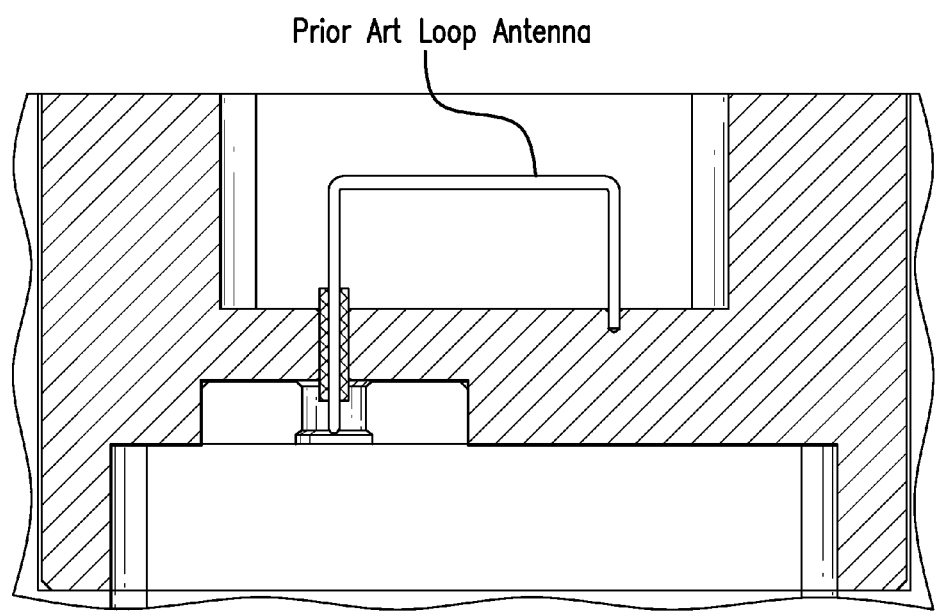
FIG. 6 depicts aspects of a prior art loop antenna.

Another three-dimensional illustration of the dual-connection fractal-shaped antenna 30 is illustrated in FIG. 4. In this embodiment, the antenna 30 is disposed in a cavity in the tool body 16 or in a cavity in one pad 20. FIG. 5 illustrates a side-view of this embodiment. It is noted that in this embodiment the second signal lead 42 is connected to ground. Accordingly, one terminal of the transmitter 14 and/or receiver 15 is also connected to ground in order to implement the dual connection. For comparison purposes, a prior-art loop antenna is illustrated in FIG. 6.

Figure 7:
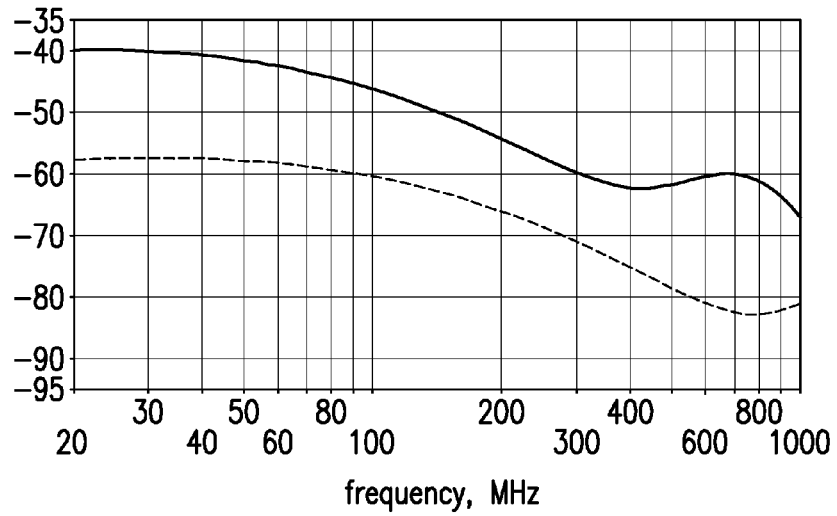
FIG. 7 depicts aspects of a comparison of performance between the dual-connection fractal-shaped antenna and the prior art single loop antenna using an impedance matching network.
Figure 8:
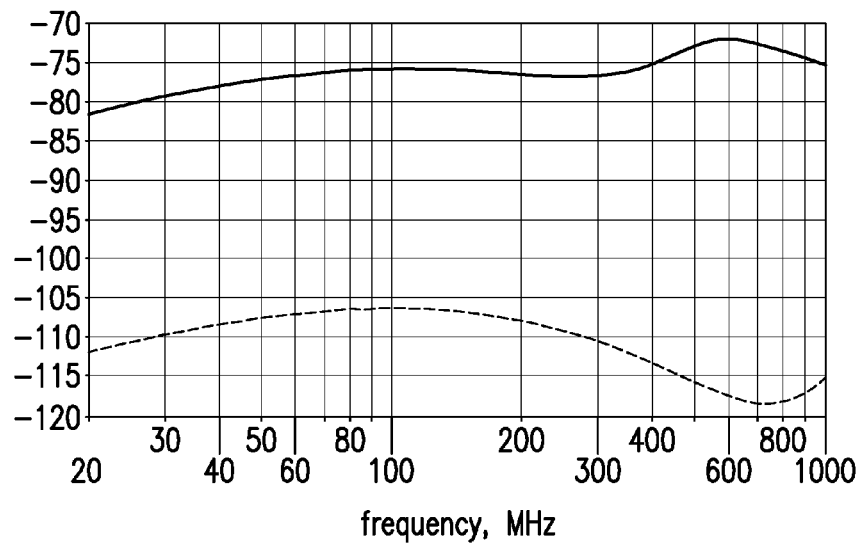
FIG. 8 depicts aspects of a comparison of performance between the dual-connection fractal-shaped antenna and the prior art single loop antenna without using the impedance matching network.

A computer simulation of the performance of the dual-connection fractal-shaped antenna 30 and the prior-art loop antenna was conducted. The formation electrical properties used in the simulation include resistance of 0.3 ohm-meters and relative permittivity of 40. The antenna configuration used in the simulation included the transmitter antenna being in the same plane as the receiver antenna and being separated by three inches. FIG. 7 is a graph of the ratio of received signal amplitude to transmitted signal amplitude as a function of frequency for the dual-connection fractal-shaped antenna and for the prior-art loop antenna, both being connected to an ideal impedance matching network. The frequency range for the simulation was 20 MHz to 1000 MHz. It can be seen that there is an improvement of at least 10 dB over the frequency range for the dual-connection fractal-shaped antenna. FIG. 8 is a graph of the ratio of received signal amplitude to transmitted signal amplitude as a function of frequency for the dual-connection fractal-shaped antenna and for the prior-art loop antenna, both not being connected to an impedance matching network, but directly to the transmitter and receiver using 50 ohm-m coaxial cable. It can be seen that there is an improvement of at least 30 dB over the frequency range for the dual-connection fractal-shaped antenna. This shows that without using an impedance matching network there is significant performance improvement of the dual-connection fractal-shaped antenna over the prior art loop antenna indicating that in certain embodiments an impedance matching network is not required.

Figure 9:
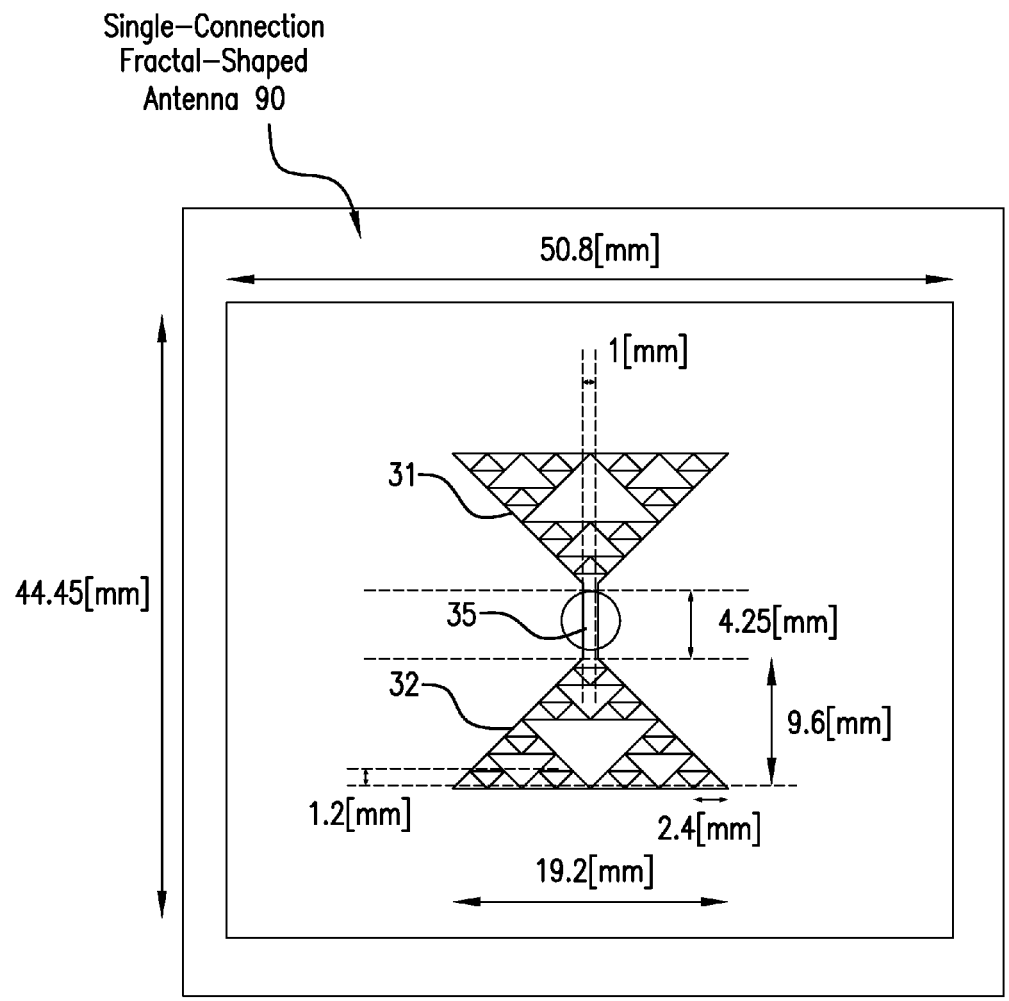
FIG. 9 depicts aspects of a single-connection patch fractal antenna in a top view.
Figure 10:
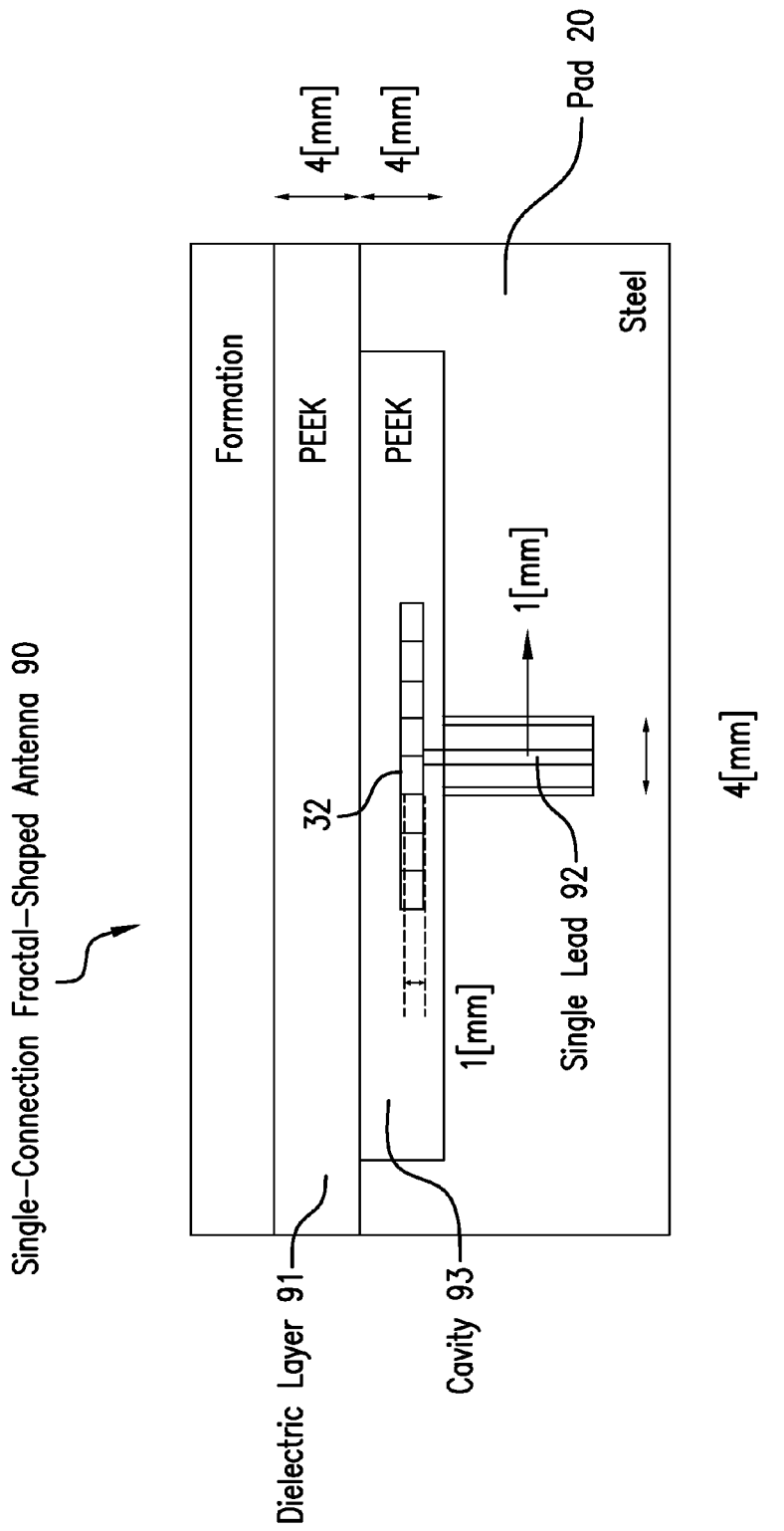
FIG. 10 depicts aspects of the single-connection patch fractal antenna in a side view.

Refer now to FIG. 9, which depicts aspects of a single-connection patch fractal-shaped antenna 90 in a top view. The term "patch antenna" relates to a radiating patch-like metal surface on one side of a dielectric substrate and a ground plane on the other side. The lower and upper metal surfaces are not connected to each other and the feed can come in various shapes such as inset feed, probe feed, indirect feed or aperture feed. The single-connection patch fractal-shaped antenna 90 as with the dual-connection fractal-shaped antenna 30 may be used as the transmitter antenna 12 and/or the receiver antenna 13. The single-connection patch fractal-shaped antenna 90 includes the first fractal-shaped antenna element 31 connected to the second fractal-shaped antenna element 32 by the center connection 35. With the single-connection patch fractal-shaped antenna 90, a single signal lead is connected to the center connection 35 similar to a connection to a prior-art patch antenna. FIG. 10 illustrates a side view of the single-connection patch fractal-shaped antenna 90 where the antenna 90 is disposed in a shallow cavity 93 of one pad 20 and encased in PEEK (polyaryletherketone). A dielectric layer 91 of PEEK is disposed over the cavity to increase signal magnitude. A signal lead 92 is connected to the center connection 35. In the embodiment of FIGS. 9 and 10, dimensions of one embodiment of the fractal-shaped antenna elements 31 and 32 as well as the center connection 35 are illustrated.

Figure 11:
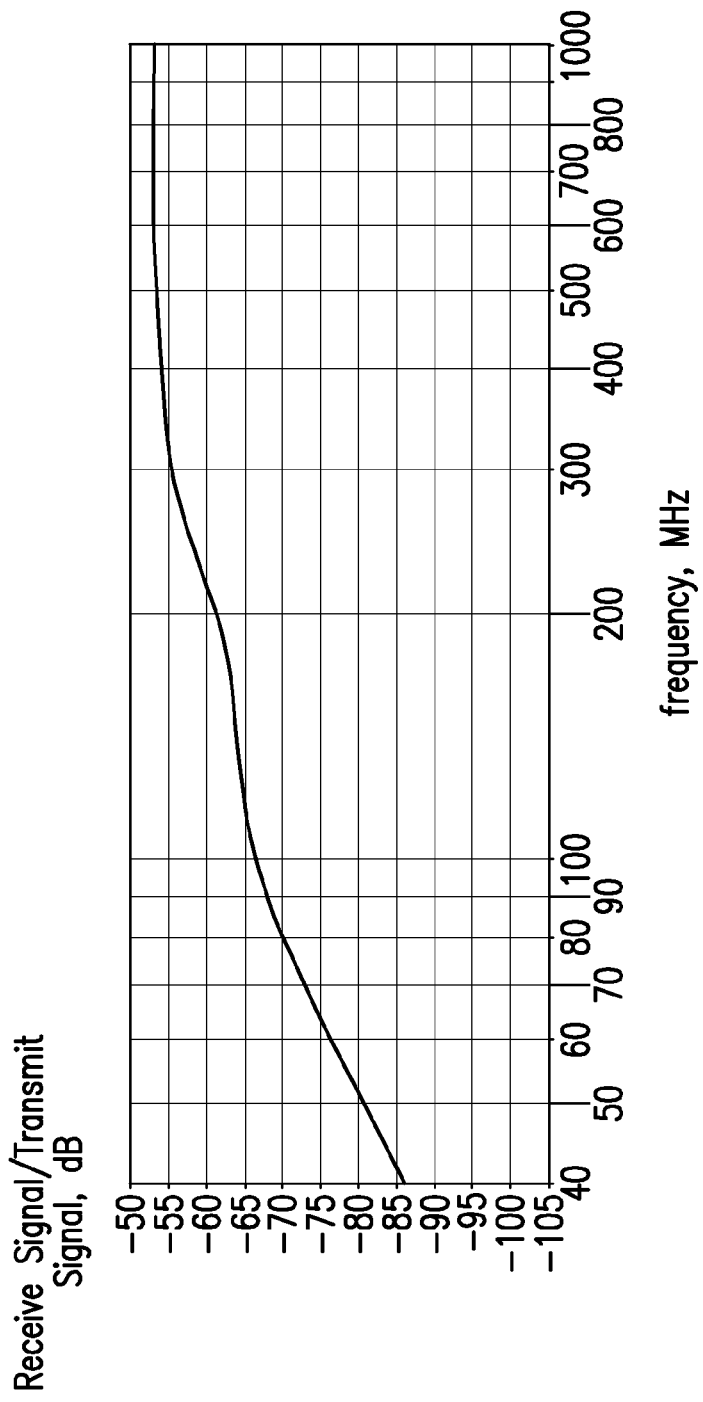
FIG. 11 illustrates one example of gain of the single-connection patch fractal antenna without using the impedance matching network.
Figure 12:
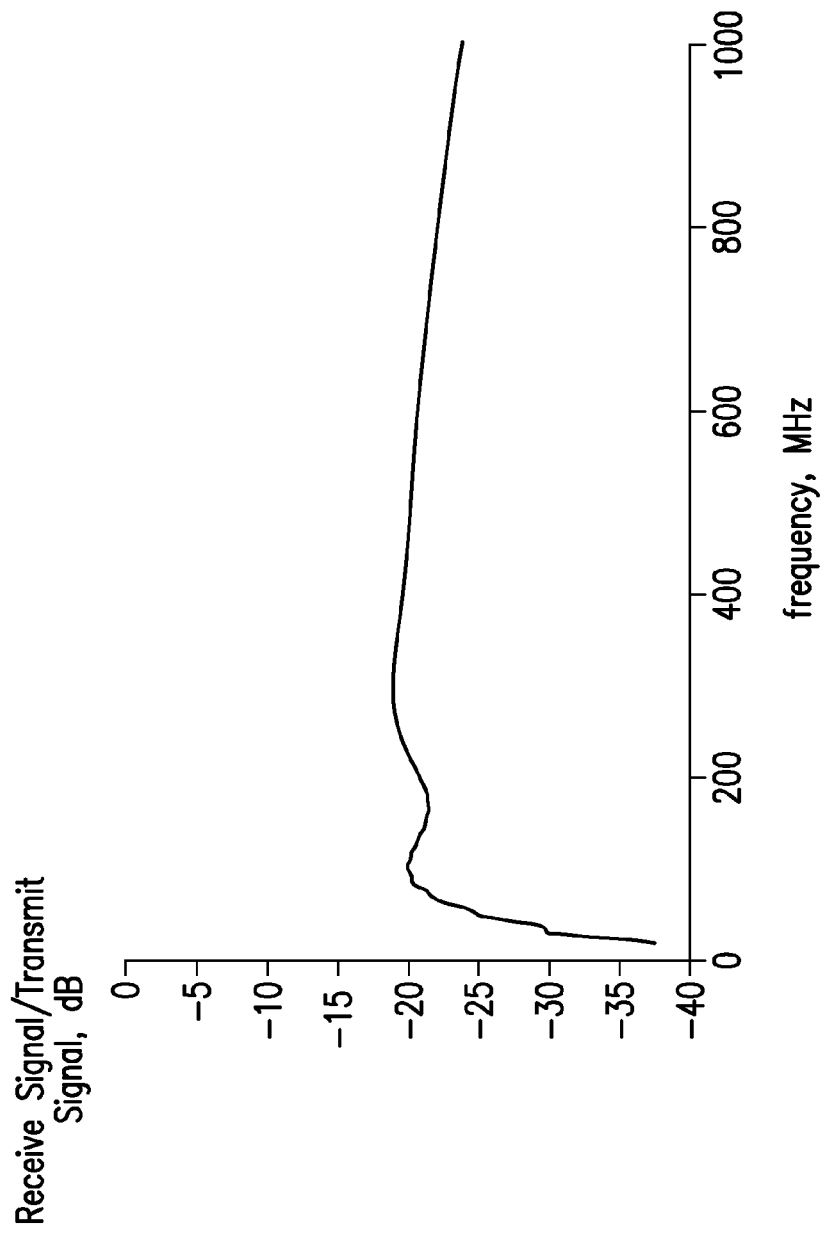
FIG. 12 illustrates one example of gain of the single-connection patch fractal antenna using the impedance matching network.

A computer simulation of the performance of the single-connection patch fractal shaped antenna 90 was conducted. The formation electrical properties used in the simulation include resistance of 0.3 ohm-meters and relative permittivity of 40. The antenna configuration used in the simulation included the transmitter antenna being in the same plane as the receiver antenna and being separated by three inches. FIG. 11 is a graph of the ratio of received signal amplitude to transmitted signal amplitude (i.e., gain) as a function of frequency for the single-connection patch fractal-shaped antenna for a 50 ohm termination without an impedance matching network. FIG. 12 is a graph of gain as a function of frequency for the single-connection fractal-shaped antenna using an impedance matching network disposed between the transmitter/receiver and the antenna 90.

Figure 13:
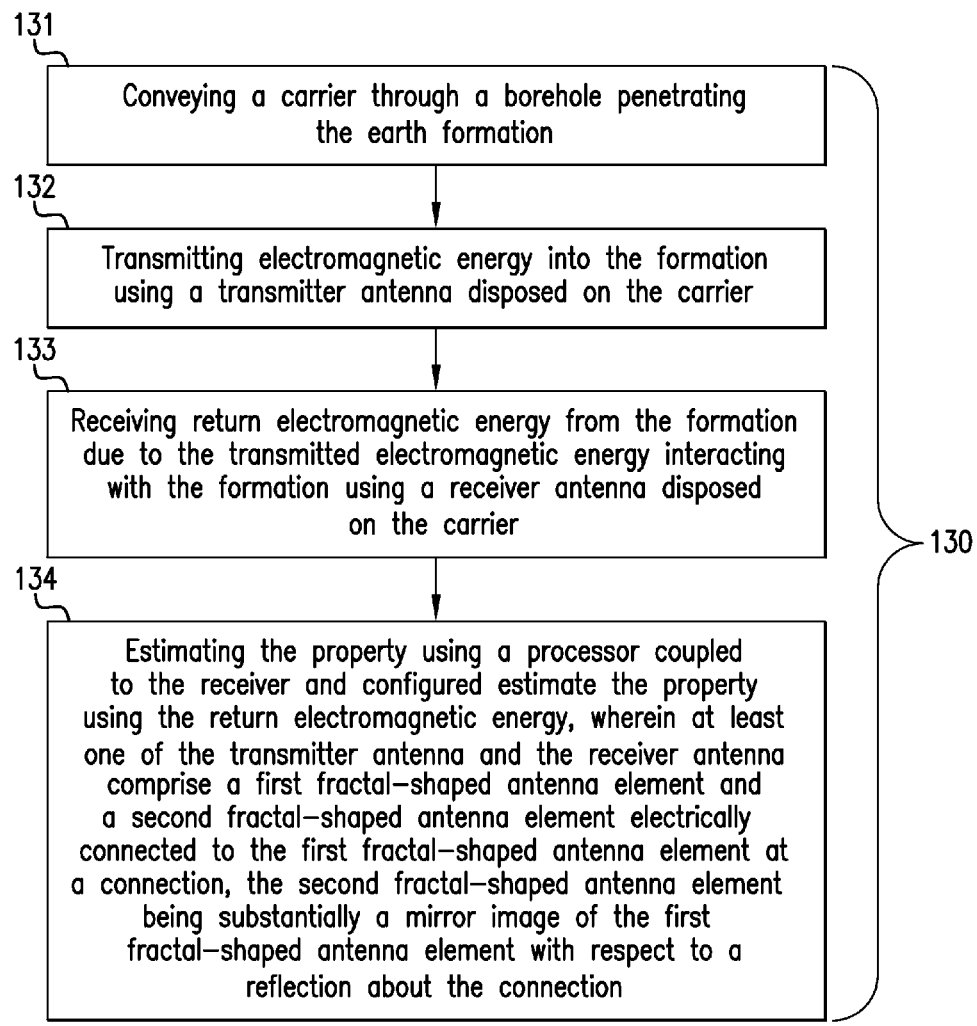
FIG. 13 is a flow chart for a method for estimating a property of an earth formation penetrated by a borehole.

FIG. 13 is a flow chart for a method 130 for estimating a property of an earth formation. Block 131 calls for conveying a carrier through a borehole penetrating the earth formation. Block 132 calls for transmitting electromagnetic energy into the formation using a transmitter antenna disposed on the carrier. Block 133 calls for receiving return electromagnetic energy from the formation due to the transmitted electromagnetic energy interacting with the formation using a receiver antenna disposed on the carrier. In one or more embodiments, the transmitter antenna and the receiver antenna may be the same antenna. Block 134 calls for estimating the property using a processor coupled to the receiver and configured estimate the property using the return electromagnetic energy, wherein at least one of the transmitter antenna and the receiver antenna include a first fractal-shaped antenna element and a second fractal-shaped antenna element electrically connected to the first fractal-shaped antenna element at a connection, the second fractal-shaped antenna element being substantially a mirror image of the first fractal-shaped antenna element with respect to a reflection about the connection. The term "substantially" in one or more embodiments relates to dimensions of the second fractal-shaped antenna element being within 10% of the dimensions of the first fractal-shaped antenna element. The mirror image in one example results from rotating the first fractal-shaped antenna element 180° about an axis traversing the connection.

The above disclosed configurations of fractal-shaped antenna elements provide several advantages. One advantage is that an improvement in gain over a wide frequency range as compared to prior-art antennas. Another advantage is that an impedance matching network may not be required due to the increase in gain, thereby freeing limited space in the downhole tool for a larger antenna or for other instruments, tools or components. Yet another advantage is a simpler design of the impedance matching network may be used due to the limited variation in the impedance of the fractal-shaped antennas over a wide range of usable frequencies of interest for resistivity and dielectric logging.

In support of the teachings herein, various analysis components may be used, including a digital and/or an analog system. For example, the downhole electronics 11, the computer processing system 12, the transmitter 14 or the receiver 15 may include digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

The term "carrier" as used herein means any device, device component, combination of devices, media and/or member that may be used to convey, house, support or otherwise facilitate the use of another device, device component, combination of devices, media and/or member. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first," "second" and the like do not denote a particular order, but are used to distinguish different elements. The term "couple" relates to a component being coupled to another component either directly or indirectly using an intermediate component. The term "configured" relates to a structural limitation of an apparatus that allows the apparatus to perform the task or function for which the apparatus is configured.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for estimating a property of an earth formation, the apparatus comprising:
   a carrier configured to be conveyed through a borehole penetrating an earth formation;
   a first fractal-shaped antenna element disposed on the carrier and configured to at least one of transmit electromagnetic energy into the formation and receive electromagnetic energy from the formation; and
   a second fractal-shaped antenna element electrically connected to the first fractal-shaped antenna element at a connection and configured to at least one of transmit electromagnetic energy into the formation and receive electromagnetic energy from the formation;
   a third fractal-shaped antenna element electrically connected to the first fractal-shaped antenna element wherein an axis of the third fractal-shaped antenna element intersects the axis of the first fractal-shaped antenna element at a first non-zero angle;
   a fourth fractal-shaped antenna element electrically connected to the second fractal antenna element wherein an axis of the fourth fractal-shaped antenna element intersects the axis of the second fractal-shaped antenna element at a second non-zero angle; and at least one of a transmitter configured to transmit an electrical signal to the first and second fractal-shaped antenna elements and a receiver configured to receive an electrical signal from the first and second fractal antenna elements;

wherein the second fractal-shaped antenna element is substantially a mirror image of the first fractal antenna element with respect to a reflection about the connection.

2. The apparatus according to claim 1, wherein the mirror image results from rotating the first fractal-shaped antenna element 180° about an axis traversing the connection.

3. The apparatus according to claim 1, further comprising a signal lead configured to couple the connection between the first fractal antenna element and the second fractal antenna element to at least one of the transmitter and the receiver.

4. The apparatus according to claim 3, wherein the connection is coupled to at least one of the transmitter and the receiver without an impedance matching network.

5. The apparatus according to claim 3, wherein the connection is coupled to at least one of the transmitter and the receiver via an impedance matching network disposed between the connection and the at least one of the transmitter and receiver.

6. The apparatus according to claim 1, wherein each of the first non-zero angle and the second non-zero angle is 90°.

7. The apparatus according to claim 1, further comprising a first signal lead configured to couple the third fractal-shaped antenna element to at least one of the transmitter and the receiver and (ii) a second signal lead configured to couple the fourth fractal-shaped antenna element to at least one of the transmitter and the receiver, respectively.

8. The apparatus according to claim 7, wherein the first signal lead is coupled to at least one of the transmitter and the receiver without an impedance matching network and the second signal lead is coupled to at least one of the transmitter and the receiver, respectively, without an impedance matching network.

9. The apparatus according to claim 7, wherein the first signal lead is coupled to at least one of the transmitter and the receiver via an impedance matching network and the second signal lead is coupled to at least one of the transmitter and the receiver, respectively, via an impedance matching network.

10. The apparatus according to claim 3, wherein the transmitter and the receiver are combined into a transceiver.

11. The apparatus according to claim 1, wherein the each of the first fractal antenna element and the second fractal antenna element comprises a repeating base motif.

12. The apparatus according to claim 11, wherein the base motif is a triangle.

13. The apparatus according to claim 1, wherein the property is electrical resistivity, electrical conductivity or dielectric permittivity.

14. The apparatus according to claim 1, wherein the carrier comprises a wireline, a slickline, drill pipe or coiled tubing.

15. The apparatus according to claim 1, wherein the carrier comprises a tool body or extendable pad and the tool body or extendable pad defines a cavity into which the first fractal-shaped antenna element, the second fractal-shaped antenna element, and the connection connecting the first fractal-shaped antenna element to the second fractal-shaped antenna element are disposed.

16. The apparatus according to claim 15, wherein the cavity is filled with a dielectric material that surrounds the first fractal-shaped antenna element, the second fractal-shaped antenna element, and the connection connecting the first fractal-shaped antenna element to the second fractal-shaped antenna element.

17. The apparatus according to claim 16, further comprising a layer of dielectric material that covers the cavity and a surface of the tool body that is adjacent to the cavity.

18. A method for estimating a property of an earth formation, the method comprising:

conveying a carrier through a borehole penetrating the earth formation;

transmitting electromagnetic energy into the formation using a transmitter antenna disposed on the carrier;

receiving return electromagnetic energy from the formation due to the transmitted electromagnetic energy interacting with the formation using a receiver antenna disposed on the carrier; and estimating the property using a processor coupled to the receiver and configured estimate the property using the return electromagnetic energy;

wherein at least one of the transmitter antenna and the receiver antenna comprises a first fractal-shaped antenna element and a second fractal-shaped antenna element electrically connected to the first fractal-shaped antenna element at a connection, the second fractal-shaped antenna element being substantially a mirror image of the first fractal-shaped antenna element with respect to a reflection about the connection;

wherein (i) the first fractal-shaped antenna element is electrically connected to a third fractal-shaped antenna having an axis that intersects the axis of the first fractal-shaped antenna at a non-zero angle and (ii) the second fractal-shaped antenna element is electrically connected to a fourth fractal-shaped antenna element having an axis that intersects the axis of the second fractal-shaped antenna element at a non-zero angle, and wherein a first signal lead is connected to the third fractal-shaped antenna element and a second signal lead is connected to the fourth fractal-shaped antenna element.

19. The method according to claim 18, wherein the mirror image results from rotating the first fractal antenna element 180° about an axis traversing the connection.

20. The method according to claim 18, wherein a first signal lead is connected to the connection.

* * * * *